United States Patent
Lakshman et al.

(10) Patent No.: US 11,673,316 B2
(45) Date of Patent: Jun. 13, 2023

(54) APPARATUS AND METHODS FOR ADDITIVE MANUFACTURING WITH VARIABLE EXTRUDER PROFILES

(71) Applicant: DIVERGENT TECHNOLOGIES, INC., Los Angeles, CA (US)

(72) Inventors: Narender Shankar Lakshman, Los Angeles, CA (US); Broc William TenHouten, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 16/840,129

(22) Filed: Apr. 3, 2020

(65) Prior Publication Data
US 2020/0230870 A1    Jul. 23, 2020

Related U.S. Application Data

(63) Continuation of application No. 15/886,761, filed on Feb. 1, 2018, now Pat. No. 10,751,934.

(51) Int. Cl.
| | |
|---|---|
| *B33Y 50/02* | (2015.01) |
| *B29C 64/112* | (2017.01) |
| *B29C 64/386* | (2017.01) |
| *B29C 64/20* | (2017.01) |
| *B33Y 10/00* | (2015.01) |
| *B29C 64/118* | (2017.01) |
| *B29C 64/209* | (2017.01) |

(Continued)

(52) U.S. Cl.
CPC .......... *B29C 64/112* (2017.08); *B29C 64/118* (2017.08); *B29C 64/20* (2017.08); *B29C 64/209* (2017.08); *B29C 64/386* (2017.08); *B29C 64/393* (2017.08); *B33Y 10/00* (2014.12); *B33Y 30/00* (2014.12); *B33Y 40/00* (2014.12); *B33Y 50/02* (2014.12)

(58) Field of Classification Search
CPC ....................................................... B33Y 50/02
USPC ............................................................ 700/118
See application file for complete search history.

(56) References Cited

U.S. PATENT DOCUMENTS

| | | |
|---|---|---|
| 5,203,226 A | 4/1993 | Hongou et al. |
| 5,742,385 A | 4/1998 | Champa |

(Continued)

FOREIGN PATENT DOCUMENTS

| | | | |
|---|---|---|---|
| CN | 106493940 A | * | 7/2017 |
| CN | 106926459 A | | 7/2017 |

(Continued)

OTHER PUBLICATIONS

US 9,202,136 B2, 12/2015, Schmidt et al. (withdrawn)

(Continued)

*Primary Examiner* — Suresh Suryawanshi
(74) *Attorney, Agent, or Firm* — Arentfox Schiff LLP

(57) ABSTRACT

Apparatus and methods for additive manufacturing with variable extruder profiles are described herein. An extruder print head with multiple nozzles placed at different angles allows for additional degrees of freedom to additively manufacture parts with complex shapes. In addition with the use of shape memory alloy materials, the diameter of one or more nozzles can be adjusted during the additive manufacturing process. This allows for independent control of the build resolution and of the build rate.

20 Claims, 13 Drawing Sheets

(51) Int. Cl.
  *B29C 64/393* (2017.01)
  *B33Y 40/00* (2020.01)
  *B33Y 30/00* (2015.01)

(56) References Cited

U.S. PATENT DOCUMENTS

| | | | |
|---|---|---|---|
| 5,990,444 A | 11/1999 | Costin | |
| 6,010,155 A | 1/2000 | Rinehart | |
| 6,096,249 A | 8/2000 | Yamaguchi | |
| 6,140,602 A | 10/2000 | Costin | |
| 6,250,533 B1 | 6/2001 | Otterbein et al. | |
| 6,252,196 B1 | 6/2001 | Costin et al. | |
| 6,318,642 B1 | 11/2001 | Goenka et al. | |
| 6,365,057 B1 | 4/2002 | Whitehurst et al. | |
| 6,391,251 B1 | 5/2002 | Keicher et al. | |
| 6,409,930 B1 | 6/2002 | Whitehurst et al. | |
| 6,468,439 B1 | 10/2002 | Whitehurst et al. | |
| 6,554,345 B2 | 4/2003 | Jonsson | |
| 6,585,151 B1 | 7/2003 | Ghosh | |
| 6,644,721 B1 | 11/2003 | Miskech et al. | |
| 6,811,744 B2 | 11/2004 | Keicher et al. | |
| 6,866,497 B2 | 3/2005 | Saiki | |
| 6,919,035 B1 | 7/2005 | Clough | |
| 6,926,970 B2 | 8/2005 | James et al. | |
| 7,152,292 B2 | 12/2006 | Hohmann et al. | |
| 7,344,186 B1 | 3/2008 | Hausler et al. | |
| 7,500,373 B2 | 3/2009 | Quell | |
| 7,586,062 B2 | 9/2009 | Heberer | |
| 7,637,134 B2 | 12/2009 | Burzlaff et al. | |
| 7,710,347 B2 | 5/2010 | Gentilman et al. | |
| 7,716,802 B2 | 5/2010 | Stern et al. | |
| 7,745,293 B2 | 6/2010 | Yamazaki et al. | |
| 7,766,123 B2 | 8/2010 | Sakurai et al. | |
| 7,852,388 B2 | 12/2010 | Shimizu et al. | |
| 7,908,922 B2 | 3/2011 | Zarabadi et al. | |
| 7,951,324 B2 | 5/2011 | Naruse et al. | |
| 8,094,036 B2 | 1/2012 | Heberer | |
| 8,163,077 B2 | 4/2012 | Eron et al. | |
| 8,286,236 B2 | 10/2012 | Jung et al. | |
| 8,289,352 B2 | 10/2012 | Vartanian et al. | |
| 8,297,096 B2 | 10/2012 | Mizumura et al. | |
| 8,354,170 B1 | 1/2013 | Henry et al. | |
| 8,383,028 B2 | 2/2013 | Lyons | |
| 8,408,036 B2 | 4/2013 | Reith et al. | |
| 8,429,754 B2 | 4/2013 | Jung et al. | |
| 8,437,513 B1 | 5/2013 | Derakhshani et al. | |
| 8,444,903 B2 | 5/2013 | Lyons et al. | |
| 8,452,073 B2 | 5/2013 | Taminger et al. | |
| 8,599,301 B2 | 12/2013 | Dowski, Jr. et al. | |
| 8,606,540 B2 | 12/2013 | Haisty et al. | |
| 8,610,761 B2 | 12/2013 | Haisty et al. | |
| 8,631,996 B2 | 1/2014 | Quell et al. | |
| 8,675,925 B2 | 3/2014 | Derakhshani et al. | |
| 8,678,060 B2 | 3/2014 | Dietz et al. | |
| 8,686,314 B2 | 4/2014 | Schneegans et al. | |
| 8,686,997 B2 | 4/2014 | Radet et al. | |
| 8,694,284 B2 | 4/2014 | Berard | |
| 8,720,876 B2 | 5/2014 | Reith et al. | |
| 8,752,166 B2 | 6/2014 | Jung et al. | |
| 8,755,923 B2 | 6/2014 | Farahani et al. | |
| 8,787,628 B1 | 7/2014 | Derakhshani et al. | |
| 8,818,771 B2 | 8/2014 | Gielis et al. | |
| 8,873,238 B2 | 10/2014 | Wilkins | |
| 8,978,535 B2 | 3/2015 | Ortiz et al. | |
| 9,006,605 B2 | 4/2015 | Schneegans et al. | |
| 9,071,436 B2 | 6/2015 | Jung et al. | |
| 9,101,979 B2 | 8/2015 | Hofmann et al. | |
| 9,104,921 B2 | 8/2015 | Derakhshani et al. | |
| 9,126,365 B1 | 9/2015 | Mark et al. | |
| 9,128,476 B2 | 9/2015 | Jung et al. | |
| 9,138,924 B2 | 9/2015 | Yen | |
| 9,149,988 B2 | 10/2015 | Mark et al. | |
| 9,156,205 B2 | 10/2015 | Mark et al. | |
| 9,186,848 B2 | 11/2015 | Mark et al. | |
| 9,244,986 B2 | 1/2016 | Karmarkar | |
| 9,248,611 B2 | 2/2016 | Divine et al. | |
| 9,254,535 B2 | 2/2016 | Buller et al. | |
| 9,266,566 B2 | 2/2016 | Kim | |
| 9,269,022 B2 | 2/2016 | Rhoads et al. | |
| 9,327,452 B2 | 5/2016 | Mark et al. | |
| 9,329,020 B1 | 5/2016 | Napoletano | |
| 9,332,251 B2 | 5/2016 | Haisty et al. | |
| 9,346,127 B2 | 5/2016 | Buller et al. | |
| 9,389,315 B2 | 7/2016 | Bruder et al. | |
| 9,399,256 B2 | 7/2016 | Buller et al. | |
| 9,403,235 B2 | 8/2016 | Buller et al. | |
| 9,418,193 B2 | 8/2016 | Dowski, Jr. et al. | |
| 9,457,514 B2 | 10/2016 | Schwärzler | |
| 9,469,057 B2 | 10/2016 | Johnson et al. | |
| 9,478,063 B2 | 10/2016 | Rhoads et al. | |
| 9,481,402 B1 | 11/2016 | Muto et al. | |
| 9,486,878 B2 | 11/2016 | Buller et al. | |
| 9,486,960 B2 | 11/2016 | Paschkewitz et al. | |
| 9,502,993 B2 | 11/2016 | Deng | |
| 9,522,522 B2 | 12/2016 | Bredt | |
| 9,525,262 B2 | 12/2016 | Stuart et al. | |
| 9,533,526 B1 | 1/2017 | Nevins | |
| 9,555,315 B2 | 1/2017 | Aders | |
| 9,555,580 B1 | 1/2017 | Dykstra et al. | |
| 9,557,856 B2 | 1/2017 | Send et al. | |
| 9,566,742 B2 | 2/2017 | Keating et al. | |
| 9,566,758 B2 | 2/2017 | Cheung et al. | |
| 9,573,193 B2 | 2/2017 | Buller et al. | |
| 9,573,225 B2 | 2/2017 | Buller et al. | |
| 9,586,290 B2 | 3/2017 | Buller et al. | |
| 9,595,795 B2 | 3/2017 | Lane et al. | |
| 9,597,843 B2 | 3/2017 | Stauffer et al. | |
| 9,600,929 B1 | 3/2017 | Young et al. | |
| 9,609,755 B2 | 3/2017 | Coull et al. | |
| 9,610,737 B2 | 4/2017 | Johnson et al. | |
| 9,611,667 B2 | 4/2017 | GangaRao et al. | |
| 9,616,623 B2 | 4/2017 | Johnson et al. | |
| 9,626,487 B2 | 4/2017 | Jung et al. | |
| 9,626,489 B2 | 4/2017 | Nilsson | |
| 9,643,361 B2 | 5/2017 | Liu | |
| 9,662,840 B1 | 5/2017 | Buller et al. | |
| 9,665,182 B2 | 5/2017 | Send et al. | |
| 9,669,586 B2 | 6/2017 | Page | |
| 9,672,389 B1 | 6/2017 | Mosterman et al. | |
| 9,672,550 B2 | 6/2017 | Apsley et al. | |
| 9,676,145 B2 | 6/2017 | Buller et al. | |
| 9,684,919 B2 | 6/2017 | Apsley et al. | |
| 9,688,032 B2 | 6/2017 | Kia et al. | |
| 9,690,286 B2 | 6/2017 | Hovsepian et al. | |
| 9,700,966 B2 | 7/2017 | Kraft et al. | |
| 9,703,896 B2 | 7/2017 | Zhang et al. | |
| 9,713,903 B2 | 7/2017 | Paschkewitz et al. | |
| 9,718,302 B2 | 8/2017 | Young et al. | |
| 9,718,434 B2 | 8/2017 | Hector, Jr. et al. | |
| 9,724,877 B2 | 8/2017 | Flitsch et al. | |
| 9,724,881 B2 | 8/2017 | Johnson et al. | |
| 9,725,178 B2 | 8/2017 | Wang | |
| 9,731,730 B2 | 8/2017 | Stiles | |
| 9,731,773 B2 | 8/2017 | Gami et al. | |
| 9,741,954 B2 | 8/2017 | Bruder et al. | |
| 9,747,352 B2 | 8/2017 | Karmarkar | |
| 9,764,415 B2 | 9/2017 | Seufzer et al. | |
| 9,764,520 B2 | 9/2017 | Johnson et al. | |
| 9,765,226 B2 | 9/2017 | Dain | |
| 9,770,760 B2 | 9/2017 | Liu | |
| 9,773,393 B2 | 9/2017 | Velez | |
| 9,776,234 B2 | 10/2017 | Schaafhausen et al. | |
| 9,782,936 B2 | 10/2017 | Glunz et al. | |
| 9,783,324 B2 | 10/2017 | Embler et al. | |
| 9,783,977 B2 | 10/2017 | Alqasimi et al. | |
| 9,789,548 B2 | 10/2017 | Golshany et al. | |
| 9,789,922 B2 | 10/2017 | Dosenbach et al. | |
| 9,796,137 B2 | 10/2017 | Zhang et al. | |
| 9,802,108 B2 | 10/2017 | Aders | |
| 9,809,977 B2 | 11/2017 | Carney et al. | |
| 9,817,922 B2 | 11/2017 | Glunz et al. | |
| 9,818,071 B2 | 11/2017 | Jung et al. | |
| 9,821,339 B2 | 11/2017 | Paschkewitz et al. | |
| 9,821,411 B2 | 11/2017 | Buller et al. | |

(56) References Cited

U.S. PATENT DOCUMENTS

| | | |
|---|---|---|
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |

(56) References Cited

U.S. PATENT DOCUMENTS

| | | | |
|---|---|---|---|
| 10,343,330 B2 | 7/2019 | Evans et al. | |
| 10,343,331 B2 | 7/2019 | McCall et al. | |
| 10,343,355 B2 | 7/2019 | Evans et al. | |
| 10,343,724 B2 | 7/2019 | Polewarczyk et al. | |
| 10,343,725 B2 | 7/2019 | Martin et al. | |
| 10,350,823 B2 | 7/2019 | Rolland et al. | |
| 10,356,341 B2 | 7/2019 | Holzer et al. | |
| 10,356,395 B2 | 7/2019 | Holzer et al. | |
| 10,357,829 B2 | 7/2019 | Spink et al. | |
| 10,357,957 B2 | 7/2019 | Buller et al. | |
| 10,359,756 B2 | 7/2019 | Newell et al. | |
| 10,369,629 B2 | 8/2019 | Mendelsberg et al. | |
| 10,382,739 B1 | 8/2019 | Rusu et al. | |
| 10,384,393 B2 | 8/2019 | Xu et al. | |
| 10,384,416 B2 | 8/2019 | Cheung et al. | |
| 10,389,410 B2 | 8/2019 | Brooks et al. | |
| 10,391,710 B2 | 8/2019 | Mondesir | |
| 10,392,097 B2 | 8/2019 | Pham et al. | |
| 10,392,131 B2 | 8/2019 | Deck et al. | |
| 10,393,315 B2 | 8/2019 | Tyan | |
| 10,400,080 B2 | 9/2019 | Ramakrishnan et al. | |
| 10,401,832 B2 | 9/2019 | Snyder et al. | |
| 10,403,009 B2 | 9/2019 | Mariampillai et al. | |
| 10,406,750 B2 | 9/2019 | Barton et al. | |
| 10,412,283 B2 | 9/2019 | Send et al. | |
| 10,416,095 B2 | 9/2019 | Herbsommer et al. | |
| 10,421,496 B2 | 9/2019 | Swayne et al. | |
| 10,421,863 B2 | 9/2019 | Hasegawa et al. | |
| 10,422,478 B2 | 9/2019 | Leachman et al. | |
| 10,425,793 B2 | 9/2019 | Sankaran et al. | |
| 10,427,364 B2 | 10/2019 | Alves | |
| 10,429,006 B2 | 10/2019 | Tyan et al. | |
| 10,434,573 B2 | 10/2019 | Buller et al. | |
| 10,435,185 B2 | 10/2019 | Divine et al. | |
| 10,435,773 B2 | 10/2019 | Liu et al. | |
| 10,436,038 B2 | 10/2019 | Buhler et al. | |
| 10,438,407 B2 | 10/2019 | Pavanaskar et al. | |
| 10,440,351 B2 | 10/2019 | Holzer et al. | |
| 10,442,002 B2 | 10/2019 | Benthien et al. | |
| 10,442,003 B2 | 10/2019 | Symeonidis et al. | |
| 10,449,696 B2 | 10/2019 | Elgar et al. | |
| 10,449,737 B2 | 10/2019 | Johnson et al. | |
| 10,461,810 B2 | 10/2019 | Cook et al. | |
| 2004/0133231 A1* | 7/2004 | Maitland | A61B 17/320725 606/200 |
| 2006/0108783 A1 | 5/2006 | Ni et al. | |
| 2007/0219480 A1* | 9/2007 | Kamen | A61M 5/14216 604/20 |
| 2008/0145204 A1* | 6/2008 | Clark | F01D 17/16 415/48 |
| 2012/0190976 A1* | 7/2012 | Kleinstreuer | A61M 25/0105 600/427 |
| 2013/0296811 A1* | 11/2013 | Bangera | B05B 1/32 604/290 |
| 2013/0296812 A1 | 11/2013 | Bangera et al. | |
| 2014/0061974 A1 | 3/2014 | Tyler | |
| 2014/0277669 A1 | 9/2014 | Nardi et al. | |
| 2014/0291886 A1 | 10/2014 | Mark et al. | |
| 2015/0093465 A1 | 4/2015 | Page | |
| 2015/0141975 A1* | 5/2015 | Bangera | B05B 12/124 606/22 |
| 2015/0201499 A1* | 7/2015 | Shinar | H05K 1/0284 425/132 |
| 2016/0271367 A1 | 9/2016 | Hyde et al. | |
| 2017/0036228 A1* | 2/2017 | Thurow | A01M 7/0042 |
| 2017/0113344 A1 | 4/2017 | Schönberg | |
| 2017/0157844 A1 | 6/2017 | Mandel et al. | |
| 2017/0165917 A1 | 6/2017 | McKiel, Jr. | |
| 2017/0173692 A1 | 6/2017 | Myerberg et al. | |
| 2017/0173884 A1 | 6/2017 | Ryan | |
| 2017/0182701 A1 | 6/2017 | Ryan et al. | |
| 2017/0341309 A1 | 11/2017 | Piepenbrock et al. | |
| 2018/0154573 A1 | 6/2018 | Miles | |
| 2018/0200955 A1* | 7/2018 | Hoelldorfer | B29C 64/209 |
| 2018/0243980 A1 | 8/2018 | Erb et al. | |
| 2018/0319079 A1 | 11/2018 | Eyal et al. | |
| 2018/0370117 A1* | 12/2018 | Gardiner | B29C 64/232 |
| 2021/0107177 A1* | 4/2021 | Giles | E04B 1/35 |

FOREIGN PATENT DOCUMENTS

| | | | |
|---|---|---|---|
| CN | 107127963 A * | 9/2017 | B33Y 30/00 |
| EP | 2772347 A1 | 9/2014 | |
| EP | 3117982 A1 | 1/2017 | |
| WO | 1996036455 A1 | 11/1996 | |
| WO | 1996036525 A1 | 11/1996 | |
| WO | 1996038260 A1 | 12/1996 | |
| WO | 2003024641 A1 | 3/2003 | |
| WO | 2004108343 A1 | 12/2004 | |
| WO | 2005093773 A1 | 10/2005 | |
| WO | 2007003375 A1 | 1/2007 | |
| WO | 2007110235 A1 | 10/2007 | |
| WO | 2007110236 A1 | 10/2007 | |
| WO | 2008019847 A1 | 2/2008 | |
| WO | 2007128586 A3 | 6/2008 | |
| WO | 2008068314 A2 | 6/2008 | |
| WO | 2008086994 A1 | 7/2008 | |
| WO | 2008087024 A1 | 7/2008 | |
| WO | 2008107130 A1 | 9/2008 | |
| WO | 2008138503 A1 | 11/2008 | |
| WO | 2008145396 A1 | 12/2008 | |
| WO | 2009083609 A2 | 7/2009 | |
| WO | 2009098285 A1 | 8/2009 | |
| WO | 2009112520 A1 | 9/2009 | |
| WO | 2009135938 A1 | 11/2009 | |
| WO | 2009140977 A1 | 11/2009 | |
| WO | 2010125057 A2 | 11/2010 | |
| WO | 2010125058 A1 | 11/2010 | |
| WO | 2010142703 A2 | 12/2010 | |
| WO | 2011032533 A1 | 3/2011 | |
| WO | 2014016437 A1 | 1/2014 | |
| WO | 2014187720 A1 | 11/2014 | |
| WO | 2014195340 A1 | 12/2014 | |
| WO | 2015193331 A1 | 12/2015 | |
| WO | 2016116414 A1 | 7/2016 | |
| WO | 2017036461 A1 | 3/2017 | |
| WO | 2017112493 A1 | 6/2017 | |
| WO | 2019030248 A1 | 2/2019 | |
| WO | 2019042504 A1 | 3/2019 | |
| WO | 2019048010 A1 | 3/2019 | |
| WO | 2019048498 A1 | 3/2019 | |
| WO | 2019048680 A1 | 3/2019 | |
| WO | 2019048682 A1 | 3/2019 | |

OTHER PUBLICATIONS

US 9,809,265 B2, 11/2017, Kinjo (withdrawn)
US 10,449,880 B2, 10/2019, Mizobata et al. (withdrawn)
International Search Report and Written Opinion dated Mar. 28, 2019 regarding PCT/US2018/065000.
Supplementary European Search Report issued for corresponding application EP 18903715, dated Aug. 27, 2021.

* cited by examiner

APPARATUS AND METHODS FOR ADDITIVE MANUFACTURING WITH VARIABLE EXTRUDER PROFILES

CROSS-REFERENCE TO RELATED APPLICATIONS

This application is a continuation of U.S. application Ser. No. 15/886,761, filed Feb. 1, 2018, pending, the entire contents of which are hereby incorporated by reference as if fully set forth herein.

BACKGROUND

Field

The present disclosure relates generally to three dimensional (3D) additive manufacturing, and more specifically to additive manufacturing with variable extruder profiles.

Background

The process of building layers of materials using a three dimensional (3D) printer is referred to as additive manufacturing (AM). A material extrusion printer is one type of 3D printer which additively manufactures solid objects on a print bed by extruding molten material through a nozzle.

A material extrusion printer is controlled by a computer which takes a 3D model of the solid object and translates it into printer control commands. In response to the control commands, the material extrusion printer feeds a filament of material, such as a thermoplastic, through an extruder head. The filament is forced into a heated nozzle where material is liquefied and extruded onto the print object. The extruder head and the print bed are moved in response to control commands so that the liquefied material can be deposited along specified coordinates to render the object.

SUMMARY

Several aspects of additively manufacturing with variable extruder profiles will be described more fully hereinafter with reference to material extrusion printers.

In one aspect an additive manufacturing (AM) apparatus comprises a print material source and a three-dimensional (3-D) print applicator. The three-dimensional print applicator comprises at least one nozzle; the at least one nozzle is configured to receive print material from the print material source and to deposit sequential layers of the print material onto a build plate to produce an AM component. A profile of the at least one nozzle is configured to vary responsive to instructions from a controller linked to the 3-D print applicator.

The at least one nozzle can be additively manufactured. The profile can comprise a nozzle opening profile, and the nozzle opening profile can comprise a diameter.

The nozzle opening profile can comprise a plurality of sizes, and the nozzle opening profile can be configured to reduce its size to a value correlative to one of more features of the AM component.

The reduction in size of the nozzle opening profile can increase a rendering accuracy of the one or more features. In response to controller instructions, the nozzle opening profile can be configured to increase its size to reduce rendering time for the AM component.

The 3-D print applicator can comprise a surface on which the at least one nozzle is arranged to deposit the print material onto the build plate; and the surface can be curved to extend outside a plane parallel to the at least one nozzle. The curved surface can comprise at least one of a concave or convex characteristic.

The at least one nozzle can comprise a plurality of nozzles arranged on the curved surface. The at least one nozzle can be configured to deposit the print material at different angles relative to the build plate.

The at least one nozzle can comprise a first removable nozzle having a first profile; and the apparatus can comprise a mechanical assembly coupled to the 3-D print applicator.

The apparatus can further include a sensor and an actuator. The sensor can be in communication with the controller for receiving instructions. The actuator can be coupled to the 3-D print applicator. Responsive to an indication from the sensor and based on the received instructions, the actuator can replace the first removable nozzle with a second removable nozzle having a second profile.

In another aspect a method of additive manufacturing comprises providing a print material source, receiving print material from the print material source, depositing sequential layers of the print material, and varying a profile of the at least one nozzle. Print material is received at a three-dimensional (3-D) print applicator. Sequential layers are deposited by at least one nozzle associated with the 3-D print applicator to thereby form a 3-D printed object. The profile of the at least one nozzle is varied in response to instructions from a controller linked to the 3-D print applicator.

The profile can comprise a nozzle opening profile; and the nozzle opening profile can comprise a diameter. The profile can comprise a nozzle curvature.

The method of additive manufacturing can further comprise automatedly selecting the nozzle opening profile to be small to accurately print small features. Automatedly selecting the nozzle opening profile to be small can comprise reducing the diameter.

The method of additive manufacturing can further comprise automatedly selecting the nozzle opening profile to be larger to reduce rendering time for the 3-D printed object. Automatedly selecting the nozzle opening profile to be larger can comprise increasing the diameter.

The method of additive manufacturing can further comprise automatedly selecting the profile to be one of concave or convex.

In another aspect an additive manufacturing (AM) apparatus comprises a print material source and a three-dimensional (3-D) print applicator. The three-dimensional print applicator may in an embodiment, but generally need not, comprise a closed loop actuator system. The closed loop actuator system comprises at least one nozzle and an actuator. The at least one nozzle is configured to receive print material from the print material source and to deposit sequential layers of the print material onto a build plate to produce an AM component.

The at least one nozzle can be additively manufactured. The at least one nozzle can comprise a nozzle opening profile; and the actuator can be a shape memory alloy actuator.

The closed loop actuator system can comprise a controller, and the controller can be configured to adjust the nozzle opening profile by controlling the shape memory alloy actuator. The nozzle opening profile can comprise a diameter of the at least one nozzle.

It will be understood that other aspects of additively manufacturing with variable extruder profiles will become readily apparent to those skilled in the art from the following detailed description, wherein it is shown and described only several embodiments by way of illustration. As will be appreciated by those skilled in the art, variable extruder profiles can be realized with other embodiments without departing from the invention. Accordingly, the drawings and detailed description are to be regarded as illustrative in nature and not as restrictive.

BRIEF DESCRIPTION OF THE DRAWINGS

Various aspects of apparatus and methods for additive manufacturing with variable extruder profiles will now be presented in the detailed description by way of example, and not by way of limitation, in the accompanying drawings, wherein.

DETAILED DESCRIPTION

Figure 1A:
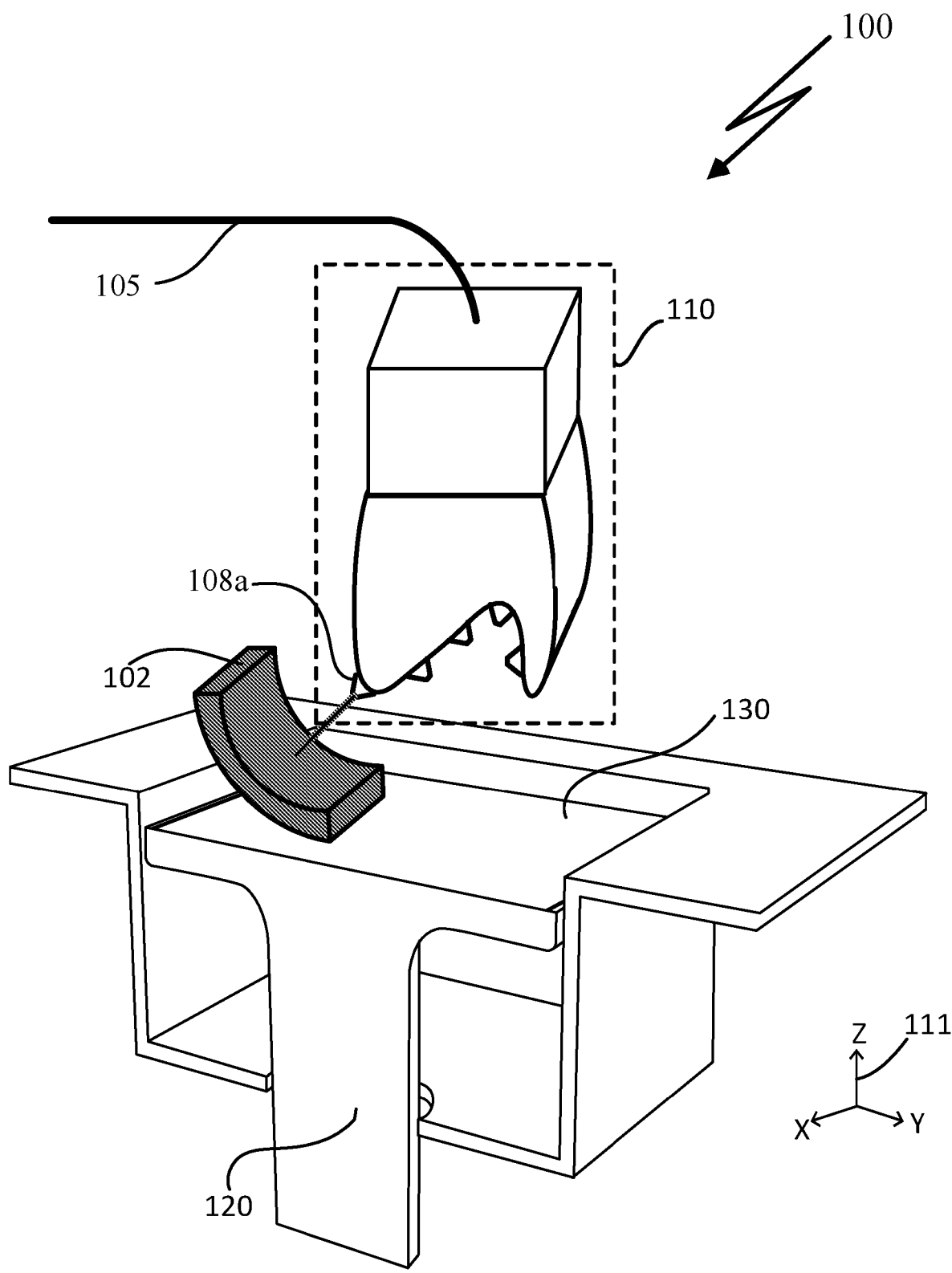
FIG. 1A illustrates a material extrusion printer using a variable extruder head according to the teachings herein.

The detailed description set forth below in connection with the drawings is intended to provide a description of exemplary embodiments of additive manufacturing using variable extruders, and it is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

Advantages of using a material extrusion printer compared to other types of 3D printers, such as selective laser sintering (SLS) printers, include lower cost and faster build times. Typically the costs for a material extrusion printer and for the associated print materials are relatively low.

In an material extrusion printer, the nozzle plays an important role by directing molten plastics in a precise manner. The nozzle liquefies the solid fiber into the molten state by utilizing a heating element. The heating element can be a resistor or a cartridge heater. Because different materials have different melting points, the printer nozzle also may use a thermistor or temperature sensor to measure and regulate the nozzle temperature to a desired value. For example, one of the most common materials used in current material extrusion printers is polylactic acid, which is printed between 180 and 200 degrees Celsius. In contrast, another material used is nylon, which is extruded at temperatures above 240 degree Celsius. The provided temperature values are guidelines, and the actual values would depend on the material extrusion printer used.

A conventional material extrusion printer typically includes a movable extruder head attached to a gantry above a print bed. The gantry moves the extruder head in the horizontal X and Y directions with a relatively slow climb in the Z direction while liquefied (molten) material is extruded to create the additively manufactured object. In this way the extruder head moves along Cartesian coordinates (i.e., the X-Y plane) and deposits material during the print process with the nozzle pointing downwards along a rotational Z axis. However, this may be an undesirable configuration for printing objects having certain complex non-planar shapes, such as, for example, objects having concave and convex surfaces. Accordingly, there is a need to develop improved extruder head nozzle configurations for printing objects with concave or convex surfaces, or other shapes for which the printer is not particularly suited.

The nozzle diameter can also be an important parameter in determining the quality and smoothness of the printed object. In particular, the nozzle diameter will determine the build resolution and quality, and it must be chosen to be small enough to produce high quality parts while maintaining reasonable build times. Because build time increases as diameter decreases, the use of a fixed diameter nozzle during a build can be an undesirable limitation. Accordingly, there is a further need to develop extruder nozzles with variable diameters that can be dynamically adjusted during the build.

Apparatus and methods for additive manufacturing with variable extruder profiles are described herein. An extruder print head with multiple nozzles placed at different angles allows for additional flexibility to additively manufacture parts with complex shapes. In addition to the use of shape memory alloy materials as described below, the diameter of one or more nozzles can be adjusted during the additive manufacturing process. This allows for independent control of the build resolution and of the build rate.

A shape memory alloy is an alloy that is able to "remember" its original shape such that when the shape memory alloy is deformed, it can return to its original, pre-deformed shape upon the application of heat to the alloy. Shape memory alloys can be coupled to a variable extruder nozzle. The nozzle can include a plurality of sections that can be actuated via the application of a suitable force or heat, resulting in a change in the opening profile of the nozzle. The use of a shape memory alloy to implement a variable extruder nozzle in a material extrusion printer advantageously allows the material extrusion printer, during the printing process, to deposit a compatible print material with varying deposition cross-sectional areas. Compared to conventional systems which may be constrained by the one (or multiple) nozzles whose opening profiles are fixed at unchangeable diameters, an actuated nozzle system using variable extruder nozzles advantageously avails an enhanced printer for fabricating parts with potentially multiple variable cross-sections per build layer/print.

FIG. 1A illustrates a material extrusion printer 100 using a variable extruder head 110 according to the teachings herein. The material extrusion printer includes the variable extruder head 110, a moveable build stage 120, and a build plate 130 at the top of the build stage 120. The variable extruder head 110 receives a filament 105 and extrudes molten filament via a nozzle 108a to build an object 102. Like other illustrations herein, the figures, or elements illustrated in the figures, are not necessarily drawn to scale and certain objects may sometimes be magnified relative to the remainder of the apparatus to highlight various features or to add overall clarity. Variable extruder head 110 in FIG. 1A may represent such an enhanced view. It should also be noted in FIG. 1A that of the various candidate nozzles on extruder head 110, nozzle 108a may be identified as the nozzle that provides the most desirable angle for 3D printing that portion of object 102. As the build proceeds and the object's angle changes, other nozzles may be selected in some embodiments.

Responsive to printing instructions, the variable extruder head 110 moves about a horizontal (X-Y) plane of a Cartesian coordinate system 111 so that extrusion nozzle 108a extrudes the material to the object 102. The variable extruder head 110 and/or the build plate 130 can also move in the Z-direction of the Cartesian coordinate system 111 to adjust the height of the extruded material.

According to the teachings herein, the variable extruder head 110 can receive instructions to vary nozzle properties in a way that improves the build time and build quality of complex non-planar structures. For instance, as shown in FIG. 1A, using the variable extruder head 110, the material extrusion printer 100 can build the concave object 102 because the extrusion nozzles in this example are oriented at ideal angles and proximities to the build plate 130 (or object 102) to effect the desired concave print. As discussed above, nozzle diameters may also be adjusted depending on the desired resolution, shape, or both, of the printed object. For example, where high print resolution is desirable in an object, the nozzle diameter may be adjusted to be smaller. Where resolution is not as essential (e.g., at a portion of the object that will not be used, or that need not have aesthetic or functional value, etc.), the nozzle diameter may be increased to decrease overall print time.

While an exemplary embodiment of the dynamically-adjustable print nozzle includes shape memory alloy materials as discussed above, the disclosure is not so limited and any number of techniques may be used to implement the variable diameter nozzles. For example, the nozzle may have built within it a network of metallic elements that may be intertwined in a manner that results in increasing or decreasing the nozzle diameter. Still other embodiments may be equally suitable.

As one of ordinary skill in the art can appreciate, different filament materials can be used for building the object 102. Depending on the intended composition of the object 102 and the need for any support material for providing support to overhanging elements of the structure that might otherwise be subject to possible gravitational deformation or collapse, a plurality of materials may be used.

For clarity, basic convex or concave shapes may be used as illustrative print objects in the figures. It should be understood, however, that the 3-D printer of the present disclosure may efficiently render potentially highly complicated print objects that have numerous curvatures and unique shapes. For example, one such print object may incorporate a variety of both convex and concave shapes. Each shape of the print object can be efficiently rendered using the principles described herein.

Figure 1B:
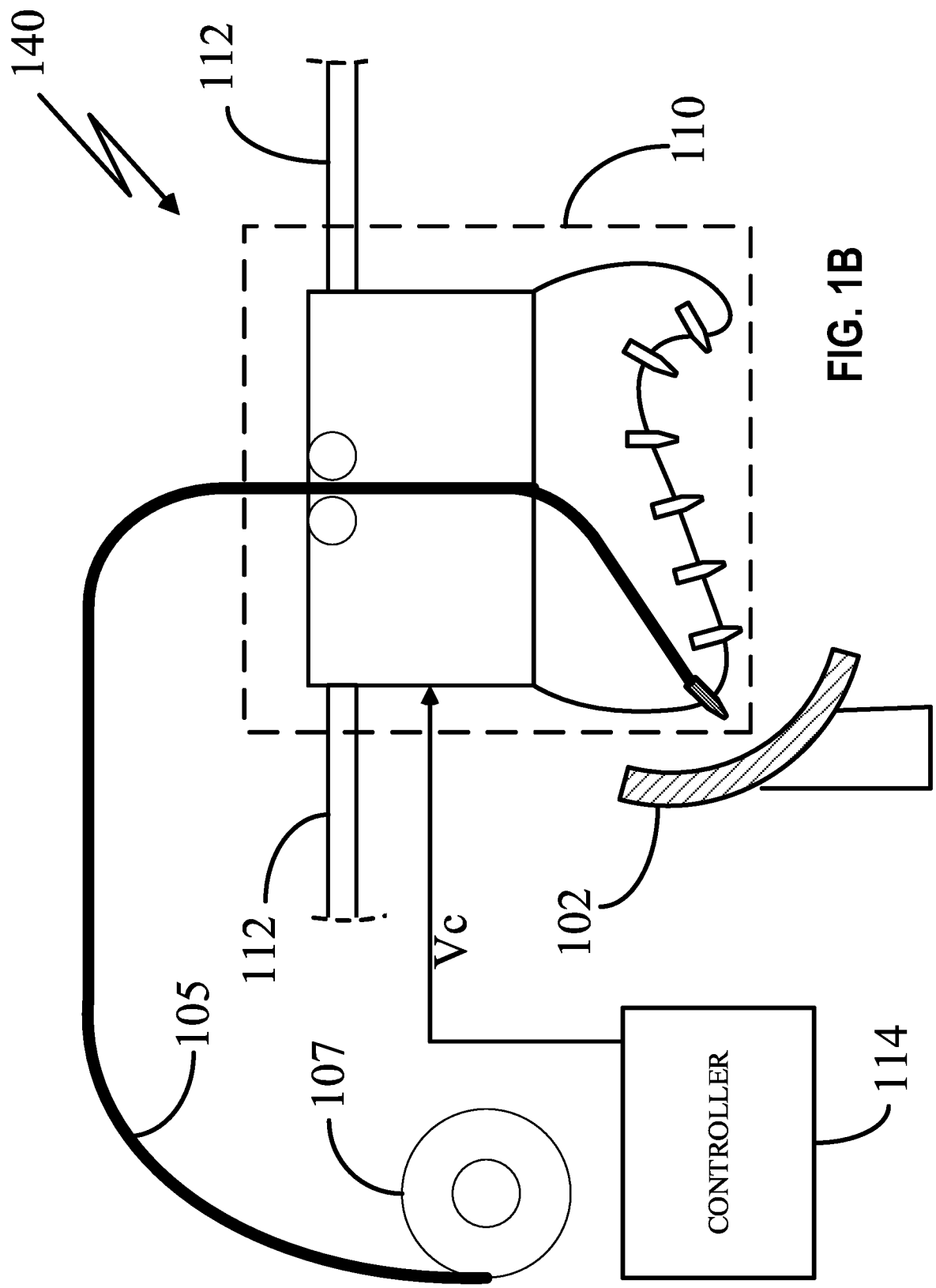
FIG. 1B illustrates another perspective of the material extrusion printer using a variable extruder head according to the teachings herein.

FIG. 1B illustrates another perspective of a material extrusion printer 140 using the variable extruder head 110 according to the teachings herein. The material extrusion printer 140 includes a filament spool 107, the filament 105, a controller 114, and the variable extruder head 110 attached to a gantry or other supporting device 112. The filament 105 can be fed to the variable extruder head 110 from the filament spool 107, and the controller 114 can send instructions to the variable extruder head 110 via a control signal Vc. For instance, the controller 114 can send the control signal Vc to adjust the position of the variable extruder head 110 along the rod 112 and also in the Z-direction. A motor or actuator can be used to position the variable extruder head 110 above the object 102. Additionally, and advantageously, the controller can send the control signal Vc to vary nozzle properties, such as nozzle diameter and nozzle rotational axis; also the controller can be part of a closed loop feedback system. In this way, complex structures having convex and concave shapes and surfaces, like object 102, can be printed in less time with improved accuracy.

Figure 2A:
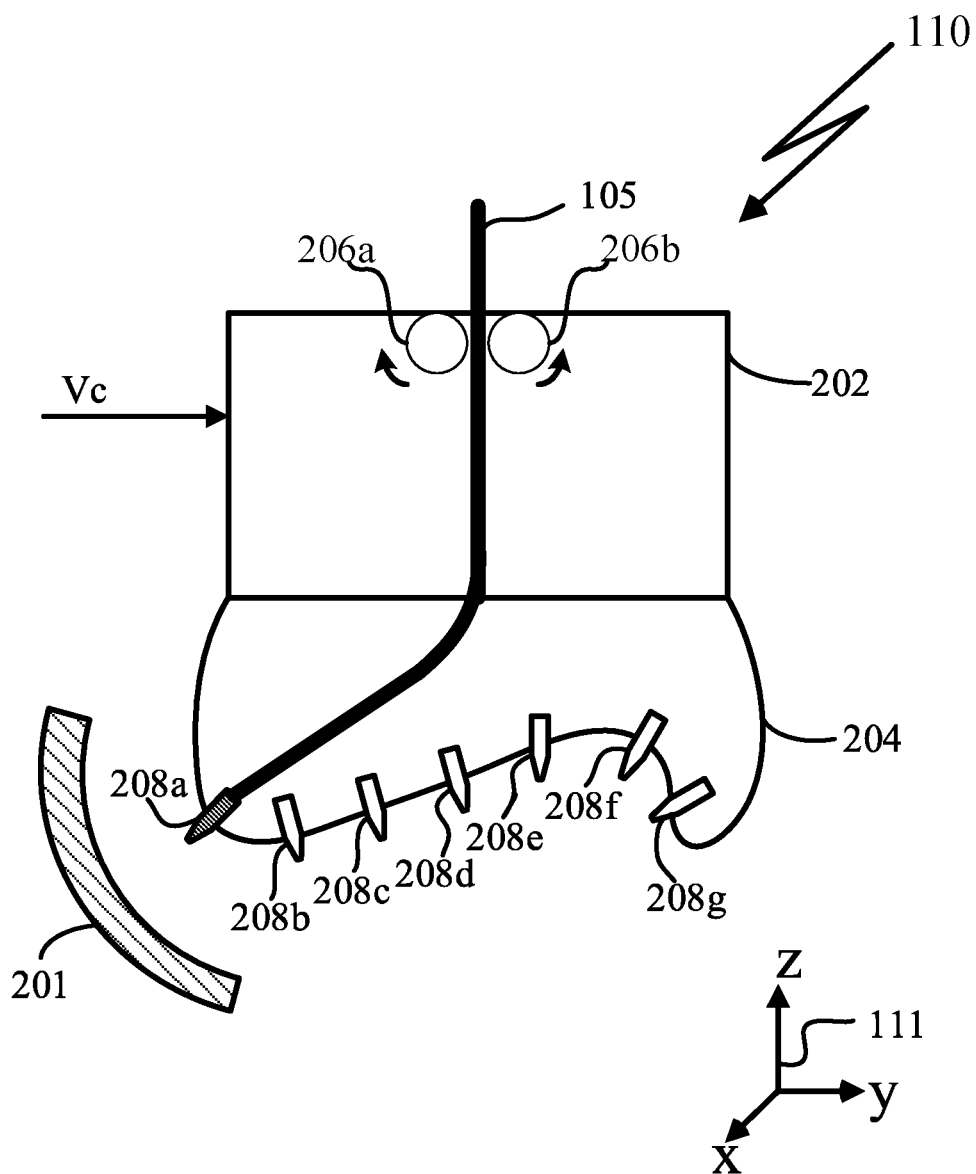
FIG. 2A illustrates a front view of the variable extruder head for printing a concave surface.

FIG. 2A illustrates a front view of the variable extruder head 110 for printing a concave surface. The variable extruder head 110 includes an upper section 202 and a lower section 204 and receives the control signal Vc. The upper section 202 includes a roller 206a and a roller 206b. The rollers 206a-b can pull the filament 105 (e.g. from the spool) into the variable extruder head 110. The lower section 204 includes nozzles 208a-g positioned at different locations and at different angles along the surface of the lower section 204.

In printing the concave surface of object 201, the control signal Vc can provide instructions to the variable extruder head 110 to control its position in the Cartesian coordinate system 111 and also to select one of the nozzles 208a-g. One of the nozzles 208a-g may be selected based on parameters of the build characteristics of object 201. For instance, as shown in FIG. 2A, in response to instructions from the control signal Vc, actuators may be used to guide the filament 105 through the nozzle 208a. In this way material can be extruded via nozzle 208a to the concave surface of object 201 with improved print accuracy and/or at an improved extrusion rate.

The actuator between rollers 206a-b may include, in one embodiment, additional sets of drive wheels used to feed the filament in a selected direction. In an embodiment, this begins with rollers 206a and 206b. Where, as here, multiple nozzles are used with one filament, additional drive wheels may be used to vector the filament in the direction of the nozzle through which the filament is to be extruded. If a set of drive wheels do not move under the command of the controller, the filament would not pass through that set of drive wheels and would not reach a given nozzle. If the controller instructs a set of drive wheels to move, they would grab onto the filament, which may be vectored in that direction. The sets of drive wheels may be housed in upper section 202 of FIG. 2A, right above the demarcation line between upper and lower sections 202 and 204. In lower section 204, a system of channels may be implemented through which the filament would flow. The channel that receives the filament from the corresponding drive wheel with which the channel is paired would send the filament to the nozzle at the other end of the channel.

In other exemplary embodiments, the material extrusion printer along with variable extruder head 110 may be configured such that, in response to instructions over control signal Vc, a more complex configuration of actuators may be used to guide the filament through more than one nozzle, either concurrently or sequentially. These embodiments may be capable of rendering very complex print objects, or may build print objects in a comparatively short time. Additionally, the control signal Vc can provide instructions to the variable extruder head 110 to select one of the nozzles 208*a-g* based on properties of the object 201.

Figure 2B:
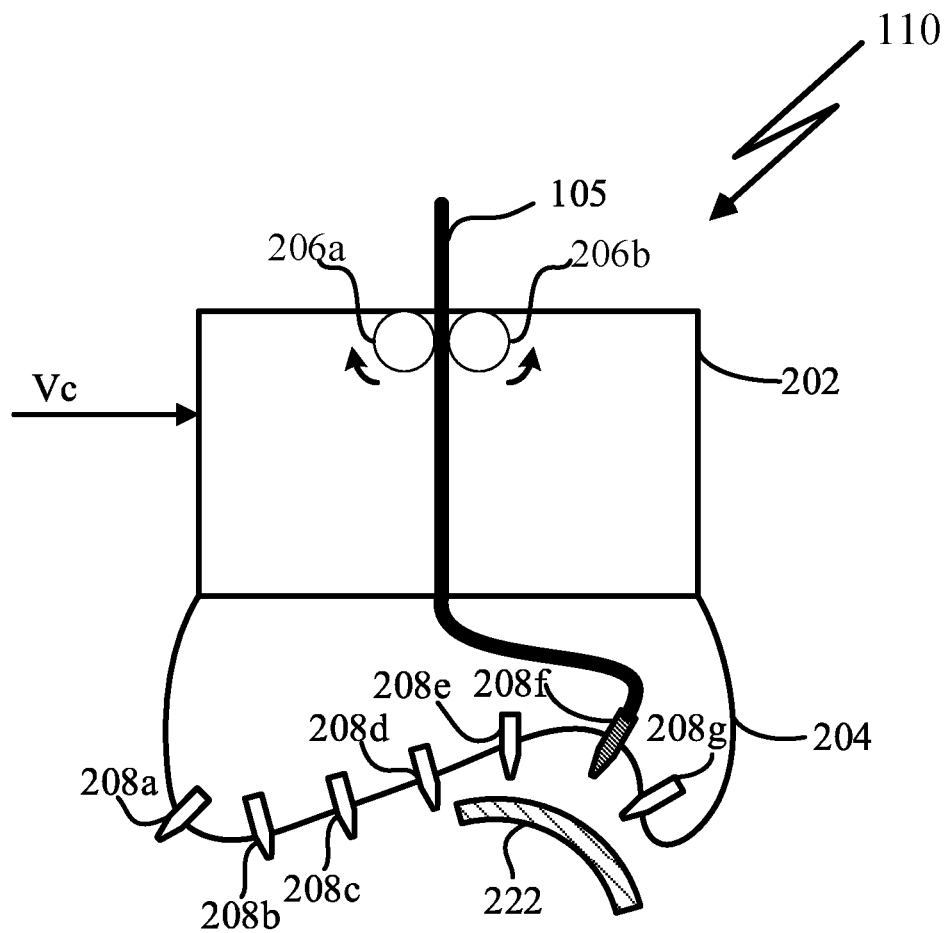
FIG. 2B illustrates a front view of the variable extruder head for printing a convex surface.

FIG. 2B illustrates a front view of the variable extruder head 110 for printing a convex surface. In response to instructions from the control signal Vc, actuators may be used to guide the filament 105 through nozzle 208*f*. In this way material can be extruded via nozzle 208*f* to the convex surface of object 222 with improved accuracy and/or at an improved extrusion rate.

In still another embodiment, the printer of FIG. 1B is used to additively manufacture portions of one or more nozzles, such as portions of nozzle 208*f* above. It will be appreciated that certain structures that comprise the nozzle may require a metallic substance or a material that can withstand higher temperatures than those of the filaments used in the material extrusion printer. In those cases, the nozzles may be additively manufactured in part using PBF type printers, or using a conventional non-additive manufacturing method. In another embodiment, the 3-D printer may be equipped with an assortment of custom nozzles through which the variable extruder head 110 can be modified automatically (e.g. robotically) or by hand to include different nozzles for different applications.

Although the embodiments of FIG. 2A and 2B show the variable extruder head 110 as having seven nozzles 208*a-g*, other configurations are possible. For instance, the lower section 204 can have greater or fewer nozzles. Also, although the extruder head 110 shows a configuration using only one filament 105, other configurations, like those shown in FIGS. 3A-3C, using more than one filament are possible.

Figure 3A:
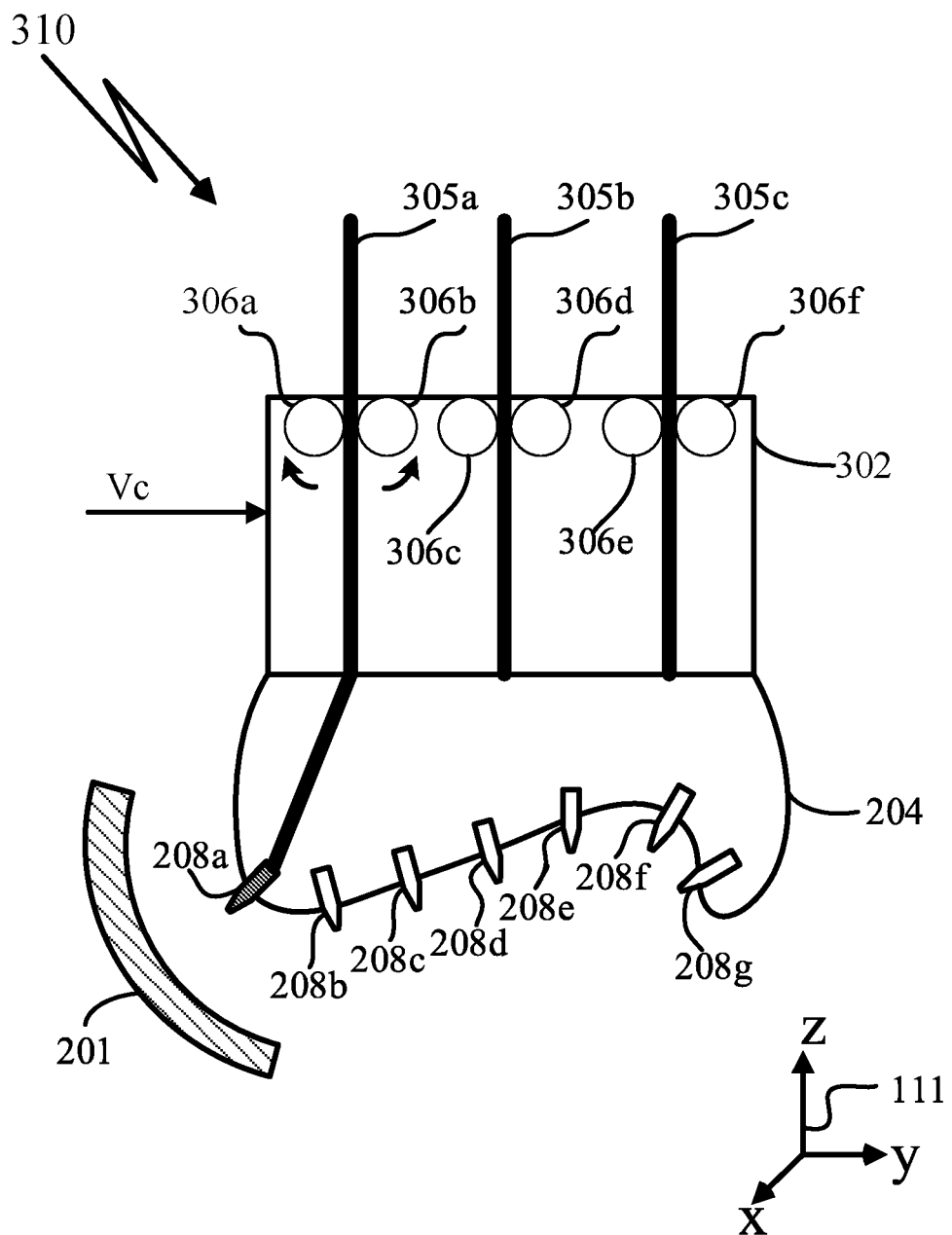
FIG. 3A illustrates a front view of a variable extruder head using more than one filament configured according to a first embodiment

FIG. 3A illustrates a front view of a variable extruder head 310 using more than one filament configured according to a first embodiment. The variable extruder 310 is similar to the variable extruder head 110 except that it allows for the intake of more than one filament by replacing the upper section 202 with an upper section 302. The upper section 302 includes rollers 306*a-b* for pulling filament 305*a* into the extruder head 310, rollers 306*c-d* for pulling filament 305*b* into the extruder head 310, and rollers 306*e-f* for pulling filament 305*c* into the extruder head 310.

Using more than one filament, the variable extruder head 310 can advantageously reduce bends and routing angles that occur when a filament is guided to one of the nozzles 208*a-g*. In an exemplary embodiment, each of the filaments 305*a-c* can be devoted to a select subset of the nozzles. For instance, as shown in FIG. 3A, when printing the concave surface of object 201, the control signal Vc can send instructions to guide filament 305*a* to nozzle 208*a*. Filament 305*a* may be selected for a subset of nozzles closer to the left side of the lower section 204. For instance, filament 305*a* may be used for a subset of nozzles 208*a-c* to extrude material. While the extruder head 310 is illustrated in FIG. 3A as having specific numbers of filaments 305*a-c* and nozzles 208*a-g* operating in exemplary configurations, it will be appreciated that the number and configuration of these devices may vary in different embodiments to result in a variety of filament-bending profiles most appropriate for a given set of applications.

Figure 3B:
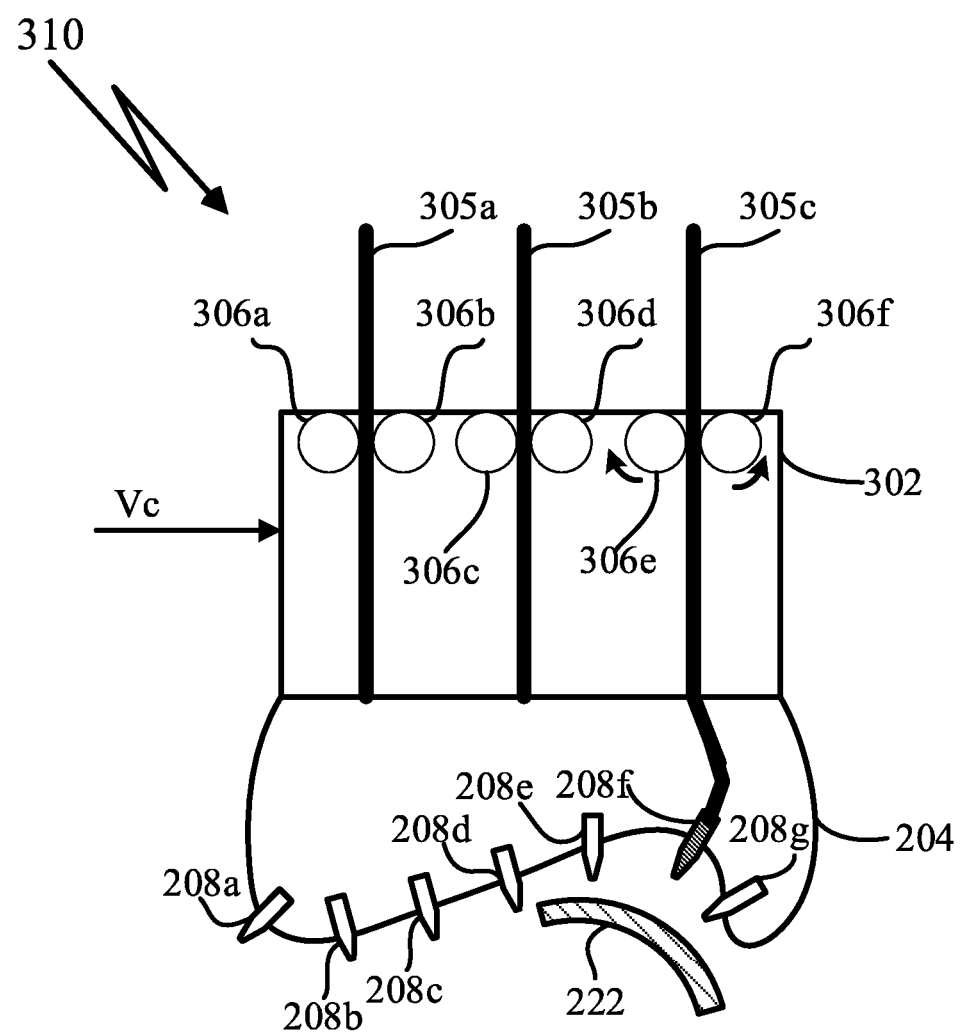
FIG. 3B illustrates a front view of the variable extruder head using more than one filament configured according to a second embodiment.

FIG. 3B illustrates a front view of the variable extruder head 310 using more than one filament configured according to a second embodiment. In the second embodiment the filament 305*c* is selected for extruding material through nozzle 208*f* to the convex surface of object 222. In this way a filament bend angle is reduced as compared to the filament bend angle in the variable extruder head 110 of FIG. 2B. The filament 305*c* can be selected for a subset of nozzles 208*f-g*. The actuators in upper portion 302 may be similar in principal to those identified and described with reference to FIG. 2B, except that additional or different techniques may be used to direct the appropriate filaments to the channels in lower portion 204 that feed the nozzles.

In some embodiments, the variable extruder head 310 includes some capability for rotational motion about its vertical axis in addition to its primary translational motion capability along the three axes. Thus, referring to nozzle 208*f* in FIG. 3B, in one embodiment Vc may instruct extruder head 310 to rotate slightly in one direction. This rotation of the extruder head 310 also causes nozzle 208*f* to rotate relative to the print object, which in turn changes the properties of the printer to accommodate different curvatures in a print object. More generally, this rotational capability means that the different nozzles 208*a-g* may all be further rotated when extruder head 310 rotates. In one embodiment, using these principles, virtually the entire rotational field from 0° to 180° may be available to use on a complex build object having sophisticated curvatures. The CAD program associated with the printer can provide a software-based solution that capitalizes on this capability and optimizes the print-out to include a range of relevant angles. The result can be a sophisticated build object printed quickly and, if desired, with a high resolution.

Figure 3C:
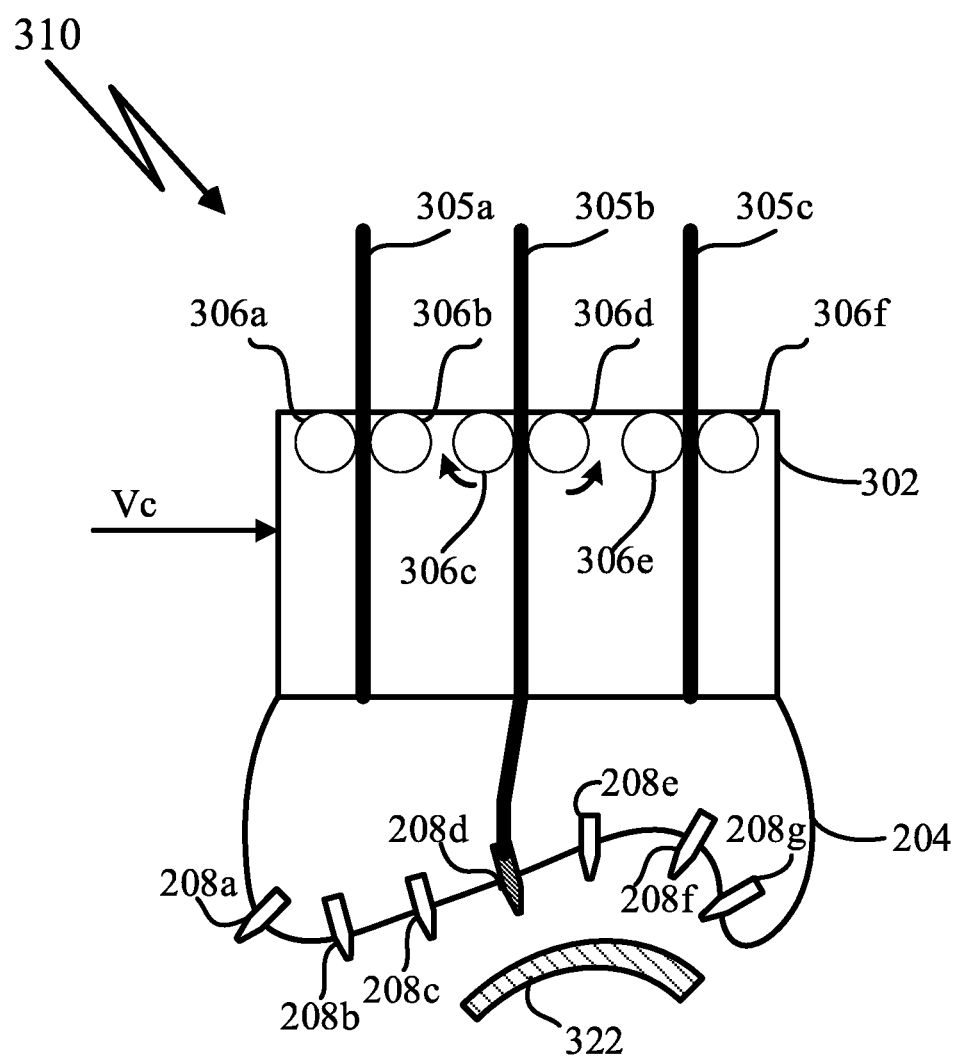
FIG. 3C illustrates a front view of the variable extruder head using more than one filament configured according to a third embodiment.

FIG. 3C illustrates a front view of the variable extruder head 310 using more than one filament 305*a-c* configured according to a third embodiment. In the third embodiment the filament 305*b* is selected for extruding material through nozzle 208*d* to the convex surface of object 322. In an embodiment, the filament 305*b* can be selected for a subset of nozzles 208*d-e*, while the filament 305*a* can be selected for a subset of nozzles 208*a-c* and the filament 305*c* can be selected for the remaining nozzles 208*f-g*.

Although FIGS. 3A-3C show the variable extruder head 310 as using three filaments 305*a-c*, other configurations having greater or fewer than three are possible. For instance, in embodiments where the lower section 204 has more than seven nozzles 208*a-g*, more than three filaments can be used to reduce filament bend angles.

Figure 4:
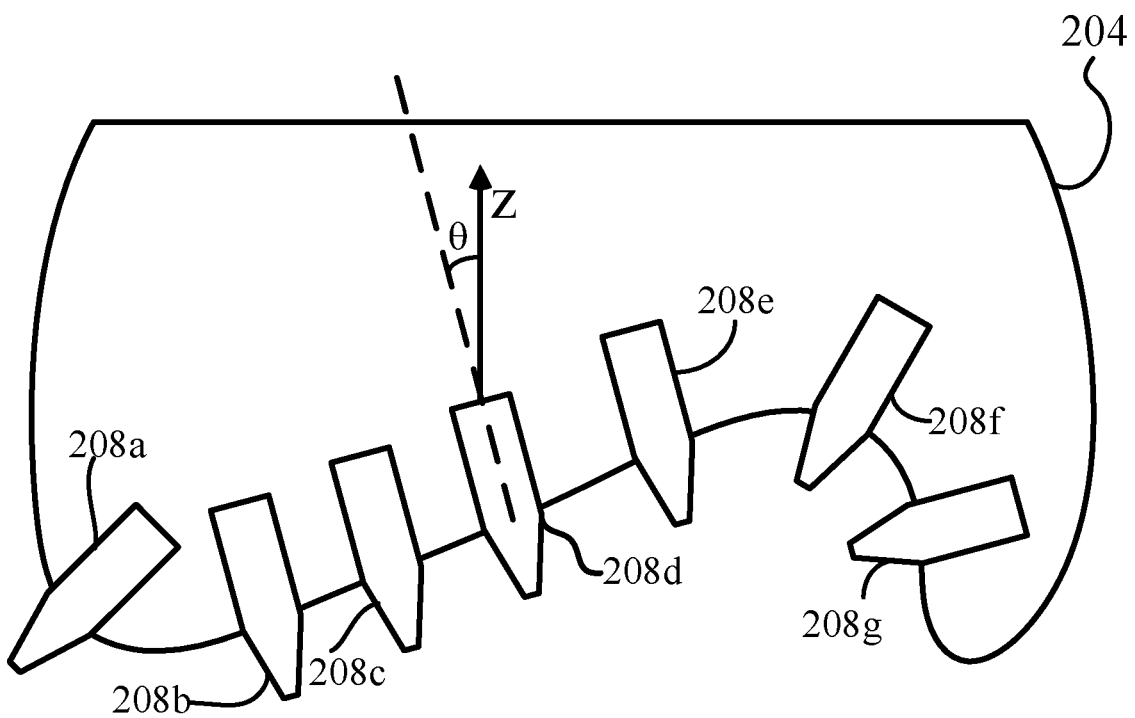
FIG. 4 illustrates a front view of the extruder nozzles within a lower section of the variable extruder head according to an embodiment.

FIG. 4 illustrates a front view of the extruder nozzles within a lower section 204 of the variable extruder head 110 according to an embodiment. In the embodiment of FIG. 4, the lower section 204 includes nozzles 208*a-g* positioned at different angles with respect to a Z-axis direction of the Cartesian coordinate system 111. Additionally, the nozzles 208a-g can be positioned to have an alignment axis parallel to a normal to the surface of the lower section 204. For instance, as shown in FIG. 4, the nozzle 208d has an axis parallel to a surface normal vector which has an angle θ relative to the Z-axis. The surface structure of the lower section 204 can be tailored to allow for any arrangement of nozzle angles. For instance, the surface can be tailored to have a Bezier curve shape.

Figure 5:
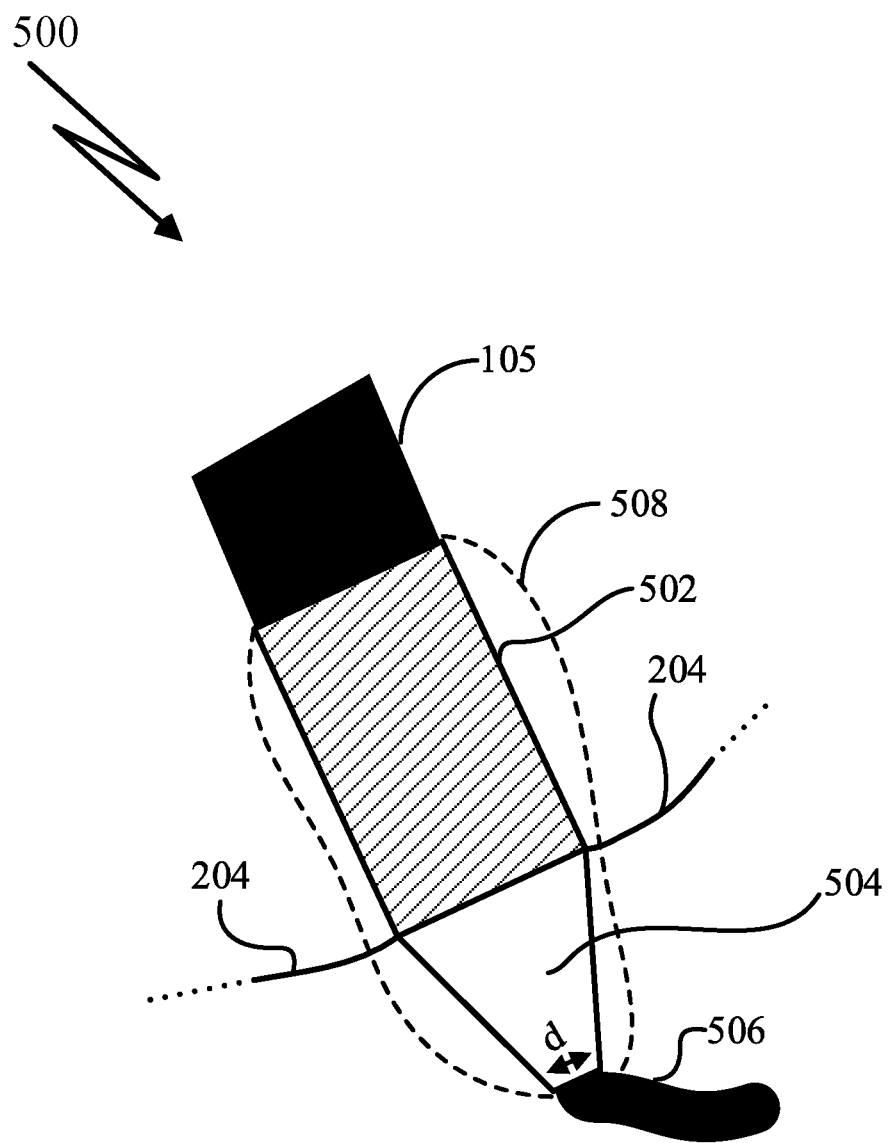
FIG. 5 illustrates a front view of an extruder nozzle according to an embodiment.

FIG. 5 illustrates a front view 500 of an extruder nozzle 508 according to an embodiment. The extruder nozzle 508 can be one of several extruder nozzles placed at angles along the surface of a lower section 204. The nozzle 508 comprises a filament liquefier chamber 502 and a nozzle head 504. Based on instructions received via control signal Vc, an actuator can guide the filament 105 into the nozzle 508. The filament 105 entering the nozzle 508 is heated within the filament liquefier chamber 502 so that molten material 506 is extruded from the tip of the nozzle head 504.

The control signal Vc can also be used to adjust the diameter d of the nozzle head 504.

The diameter d of the nozzle head 504 can determine the resolution and build time of the printed object. As the diameter d decreases, the resolution can increase while the build time increases.

Figure 6B:
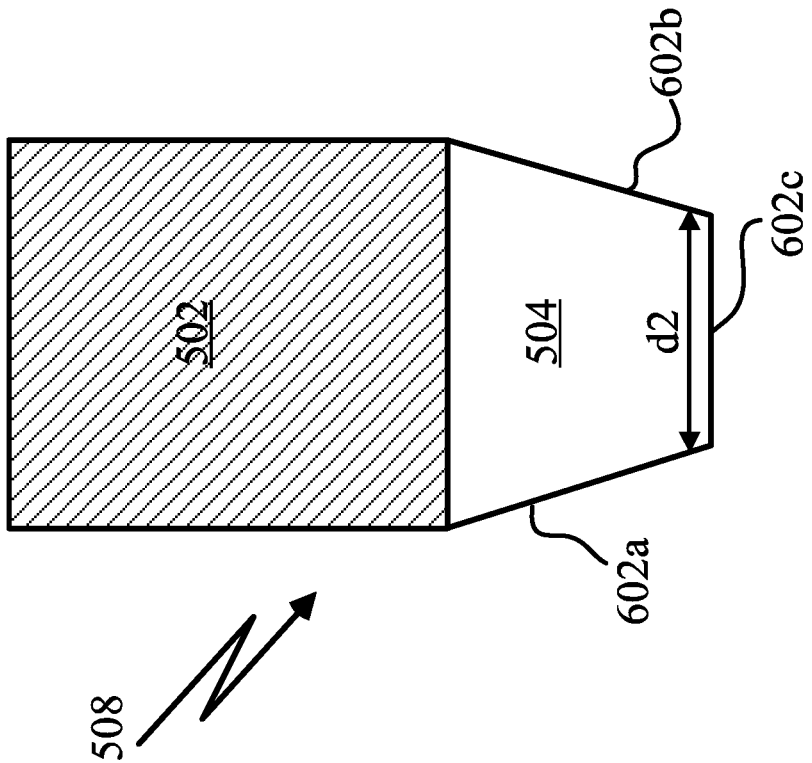
FIG. 6B illustrates the variable extruder nozzle configured to have a second nozzle diameter according to the teachings herein.
Figure 6A:
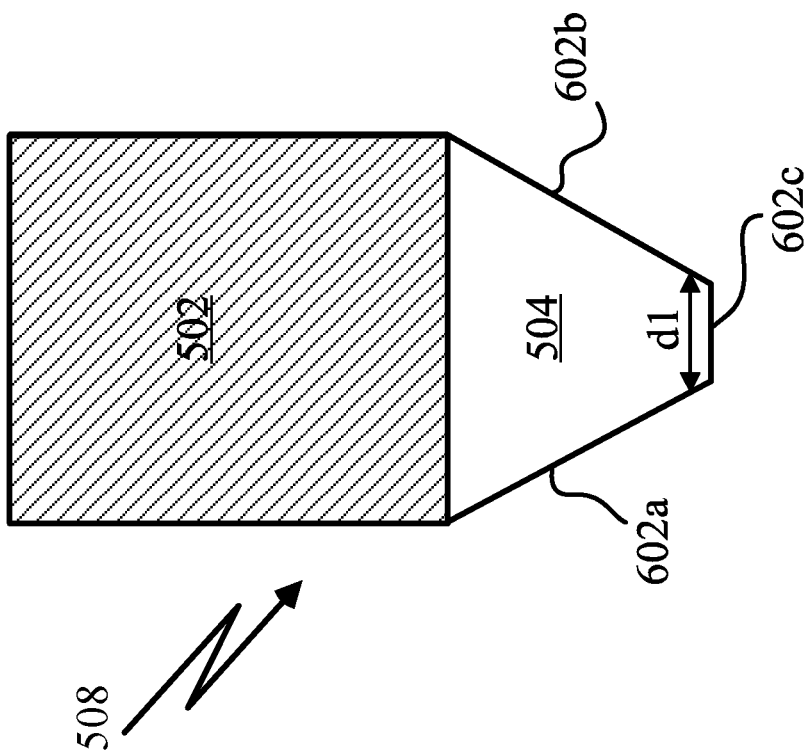
FIG. 6A illustrates a variable extruder nozzle configured to have a first nozzle diameter according to the teachings herein.

For instance, FIG. 6A illustrates a variable extruder nozzle 508 configured to have a first nozzle diameter d1 according to the teachings herein; and FIG. 6B illustrates the variable extruder nozzle 508 configured to have a second nozzle diameter d2, greater than d1 according to the teachings herein. For fine geometry sections of a build, the control signal Vc can send instructions to reduce diameter to d1, while for coarser geometry sections of a build, the control signal Vc can send instructions to increase diameter to d2. Although the concept of varying the diameter of a variable extruder nozzle 508 is shown with respect to a single nozzle, the concept may also be applied to the nozzles 208a-g described above. For instance, the variable extruder head 110 can have nozzles 208a-g, each with a controllable diameter as described herein.

Figure 7:
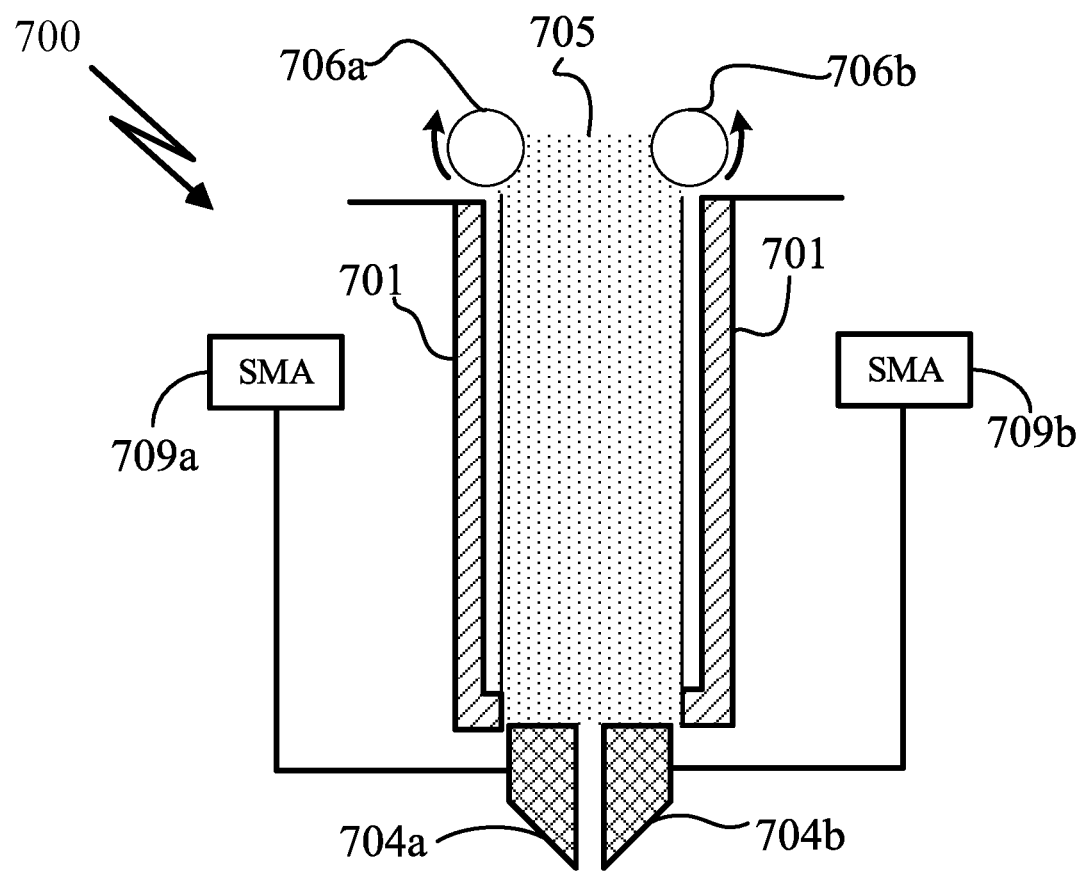
FIG. 7 illustrates a cross section of a smart memory alloy variable extruder nozzle using smart memory alloy actuators according to an embodiment.

FIG. 7 illustrates a cross section of a smart memory alloy (SMA) variable extruder nozzle 700 using SMA actuators 709a-b according to an embodiment. The SMA variable extruder nozzle 700 includes rollers 706a-b, a filament liquefier chamber 701, and nozzle segments 704a-b which are mechanically controlled by the SMA actuators 709a-b. The rollers 706a-b draw filament 705 into the filament liquefier chamber 701 where the filament 705 is heated to a molten state. A control signal can be used to control the manner in which the nozzle segments 704a-b adjust a nozzle diameter via the SMA actuators 709a-b. For instance, control signals can be used to cause the SMA actuators 709a-b to force a movement of the nozzle segments 704a-b.

The SMA variable extruder nozzle 700 can be used as a nozzle in one of the previous variable extruder heads (e.g. variable extruder head 110). Additionally, the SMA variable extruder nozzle 700 can be controlled via a control signal Vc within a closed loop or open loop system.

The nozzle segments 704a-b may be actuated via the SMA actuators 709a-b by instructions via a control signal in order to adjust an opening profile (diameter). Although, the SMA variable extruder nozzle 700 shows a cross section with two nozzle segments 704a-b, the nozzle can have multiple segments; and each of the segments may be actuated by an SMA actuator to vary an opening profile (diameter) of the nozzle.

Although actuation of the nozzle segments 704a-b is shown to occur via SMA actuators 709a-b, other actuator systems are possible. For instance, actuation may be achieved through a variety of technologies—hydraulic actuators, pneumatic actuators, linear actuators, electromechanical actuators, and other types of smart material actuators. In addition to SMA materials, shape memory polymers (SMPs) may be used to create actuators.

Additionally, the SMA variable extruder nozzle 700 can be part of a material extrusion-based additive manufacturing system. Also, as one of ordinary skill in the art can appreciate, SMAs are temperature sensitive; and an SMA actuation system can likewise be temperature sensitive.

As one of ordinary skill in the art can appreciate, SMA transition temperatures are typically between 10 to 100 degrees Celsius. An SMA can be heated to gain its shape prior to deformation and cooled to return to its deformed shape. SMAs typically operate through Joule heating, and the same principle can be applied to the SMA variable extruder nozzle 700 and SMA actuators 709a-b.

As described above, the variable extruder nozzle 700 and SMA actuators 709a-b can be connected to a closed-loop control system which can elevate the temperature of the SMA based on a variety of variables: material being extruded, temperature of the nozzle, instructions from computer aided design (CAD) via the control signal Vc. Instructions can further be based upon object (e.g. object 102) parameters including geometry, curvature, and the like. Instructions can be sent to the controller (e.g. controller 114) to adjust the temperature of the SMA by adding heat or providing cooling functionality.

The SMA actuators 709a-b can be connected to additional segments of the SMA variable extruder nozzle 700 to operate as actuators. The connection between the SMA actuators 709a-b and the nozzle segments 704a-b can be insulated thermally and electrically so that the heat from the nozzle area, tip, and surrounding regions do not heat the SMA.

To avoid unintended actuation, the SMA actuators 709a-b may in an embodiment be positioned so as to not be exposed to extreme and/or elevated temperature. The SMA actuators 709a-b can be placed in a thermally insulated location in the printer, sufficiently clear of the regions immediately surrounding the end of the extruder/nozzle segments. The SMA actuators 709a-b can be positioned away and/or insulated from heat producing elements of the SMA variable extruder nozzle 700. For instance, the SMA actuators 709a-b can be away from the extreme temperatures of the liquefier chamber 701; also isolation and/or insulation material can be placed between the SMA actuators 709a-b and heat producing elements of the SMA variable extruder nozzle 700. Also, a cooling system can be used to control and/or cool the SMA actuators 709a-b.

Figure 8A:
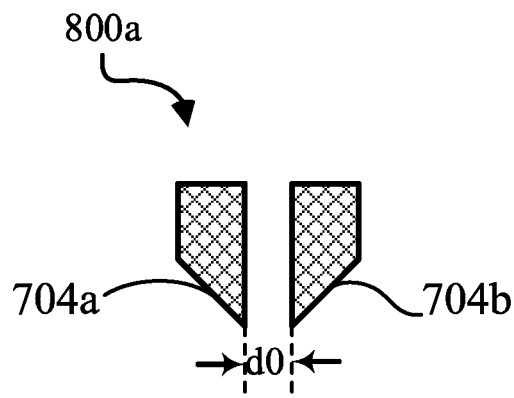
FIG. 8A illustrates a cross section of an opening profile of variable extruder nozzle segments having a first diameter according to an embodiment.
Figure 8B:
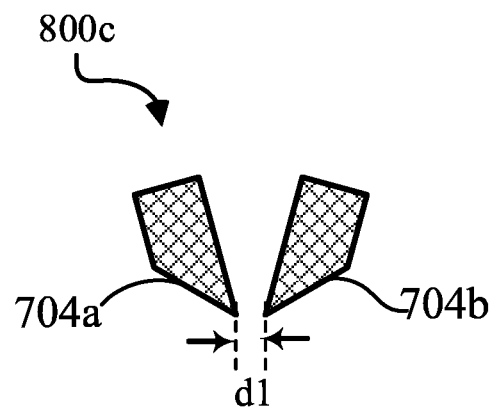
FIG. 8B illustrates a cross section of an opening profile of variable extruder nozzle segments having a second diameter according to an embodiment.
Figure 8C:
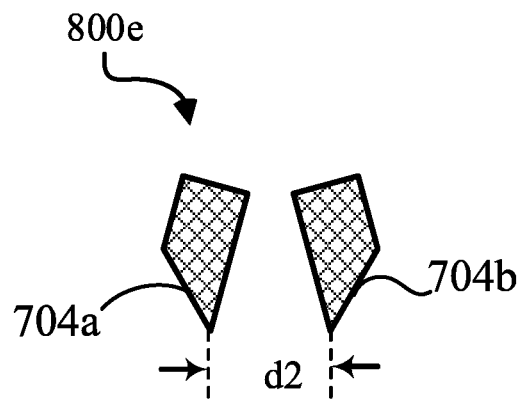
FIG. 8C illustrates a cross section of an opening profile of variable extruder nozzle segments having a third diameter according to an embodiment.

As shown in following FIGS. 8A-C, using SMA actuators 709a-b to control opening profiles can advantageously allow for a variety of opening profiles by varying a diameter of the SMA variable extruder nozzle 700.

FIG. 8A illustrates a cross section 800a of an opening profile of variable extruder nozzle segments 704a-b having a first diameter d0 according to an embodiment.

FIG. 8B illustrates a cross section 800c of an opening profile of variable extruder nozzle segments 704a-b having a second diameter d1 according to an embodiment.

FIG. 8C illustrates a cross section 800e of an opening profile of variable extruder nozzle segments 704a-b having a third diameter d2 according to an embodiment.

As illustrated by FIGS. 8A-8C, actuators, such as the SMA actuators 709a-b, can control diameter. In the embodiments of FIGS. 8A-8C, diameter d2 is greater than diameter d0, and diameter d1 is less than diameter d0.

Figure 9:
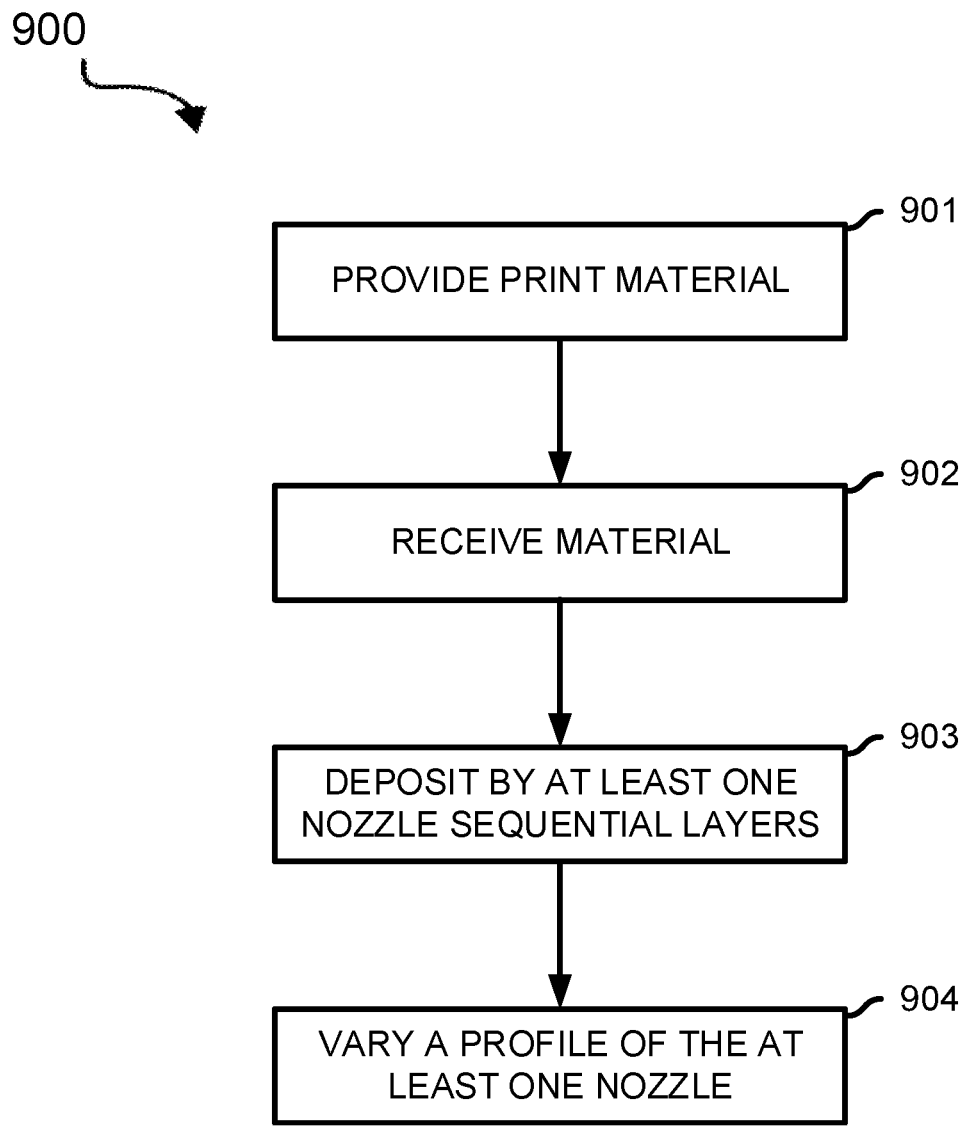
FIG. 9 conceptually illustrates a method of using a material extrusion printer according to an embodiment.

FIG. 9 conceptually illustrates a method 900 of using a material extrusion printer according to an embodiment. The method 900 includes steps 901-904. In step 901 filament material (e.g. filament 105) is provided to a variable extruder head 110. In step 902 material is received by the variable extruder head 110. In step 903 layers are deposited sequentially. In step 904 a profile of at least one nozzle 904 is varied according to the teachings herein.

The above sub-processes represent non-exhaustive examples of specific techniques to accomplish objectives described in this disclosure. It will be appreciated by those skilled in the art upon perusal of this disclosure that other sub-processes or techniques may be implemented that are equally suitable and that do not depart from the principles of this disclosure.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for additively manufacturing transport vehicles including automobiles, airplanes, boats, motorcycles, and the like.

Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An additive manufacturing (AM) apparatus, comprising:
    a print material source; and
    a three-dimensional (3-D) print applicator comprising an actuator system, the actuator system comprising:
    an extruder including at least one print member having an opening configured to receive print material from the print material source and to deposit sequential layers of the print material onto a build plate to produce an AM component;
    an actuator configured to adjust an opening profile of the opening of the print member; and
    a print controller in communication with the actuator, wherein the actuator is configured to replace, during print operation and responsive to instructions from the print controller, a first print member with a second print member having a different profile.

2. The method of claim 1, wherein the print member includes a nozzle.

3. The apparatus of claim 1, wherein the opening profile comprises a diameter of the opening.

4. The apparatus of claim 1, wherein the actuator system comprises a closed-loop system.

5. The apparatus of claim 3, wherein the opening profile is adjusted by adjusting the diameter of the at least one opening.

6. The apparatus of claim 2, wherein the nozzle comprises a plurality of sections, such that each section in the plurality of sections of the nozzle is operable to adjust the nozzle opening profile.

7. The apparatus of claim 6, wherein a first section of the plurality of sections of the nozzle adjusts the nozzle opening profile via a change in thermal energy.

8. The apparatus of claim 6, wherein a first section of the plurality of sections of the nozzle adjusts the nozzle opening profile via a change in applied force.

9. The apparatus of claim 1, wherein a layer in the AM component comprises at least one variable cross-section.

10. The apparatus of claim 1, wherein the opening profile is adjusted based on a desired resolution of the AM component.

11. A method for additive manufacturing (AM) a component, comprising:
    receiving a print material at a three-dimensional (3-D) print applicator, wherein the 3D print applicator comprises a first removable nozzle and at least one actuator;
    depositing a plurality of layers of the print material onto a build plate to produce an AM component;
    configuring at least one of the first nozzle and the at least one actuator to adjust a nozzle opening profile of the first removable nozzle during AM of the component; and
    replacing, during 3-D print operation, the first removable nozzle having a first profile with a second removable nozzle having a second profile.

12. The method of claim 11, in which configuring the first nozzle comprises adjusting a diameter of the first nozzle.

13. The method of claim 11, in which at least one actuator of the at least one actuator is a shape memory actuator.

14. The method of claim 11, further comprising a plurality of nozzle segments arranged on the print applicator.

15. The method of claim 14, in which each nozzle segment in the plurality of nozzle segments is coupled to an actuator of the at least one actuators.

16. The method of claim 11, in which adjusting the nozzle opening profile of the 3-D print applicator is performed in a closed-loop system.

17. The method of claim 11, wherein depositing a plurality of layers of the print material comprises depositing at least one layer having a variable cross-section.

18. The method of claim 11, wherein adjusting the nozzle opening profile of the nozzle is based on a desired resolution of the AM component.

19. The apparatus of claim 2, wherein the at least one nozzle is additively manufactured.

20. The method of claim 1, wherein the actuator includes a shape memory alloy actuator.

* * * * *